UNITED STATES PATENT OFFICE.

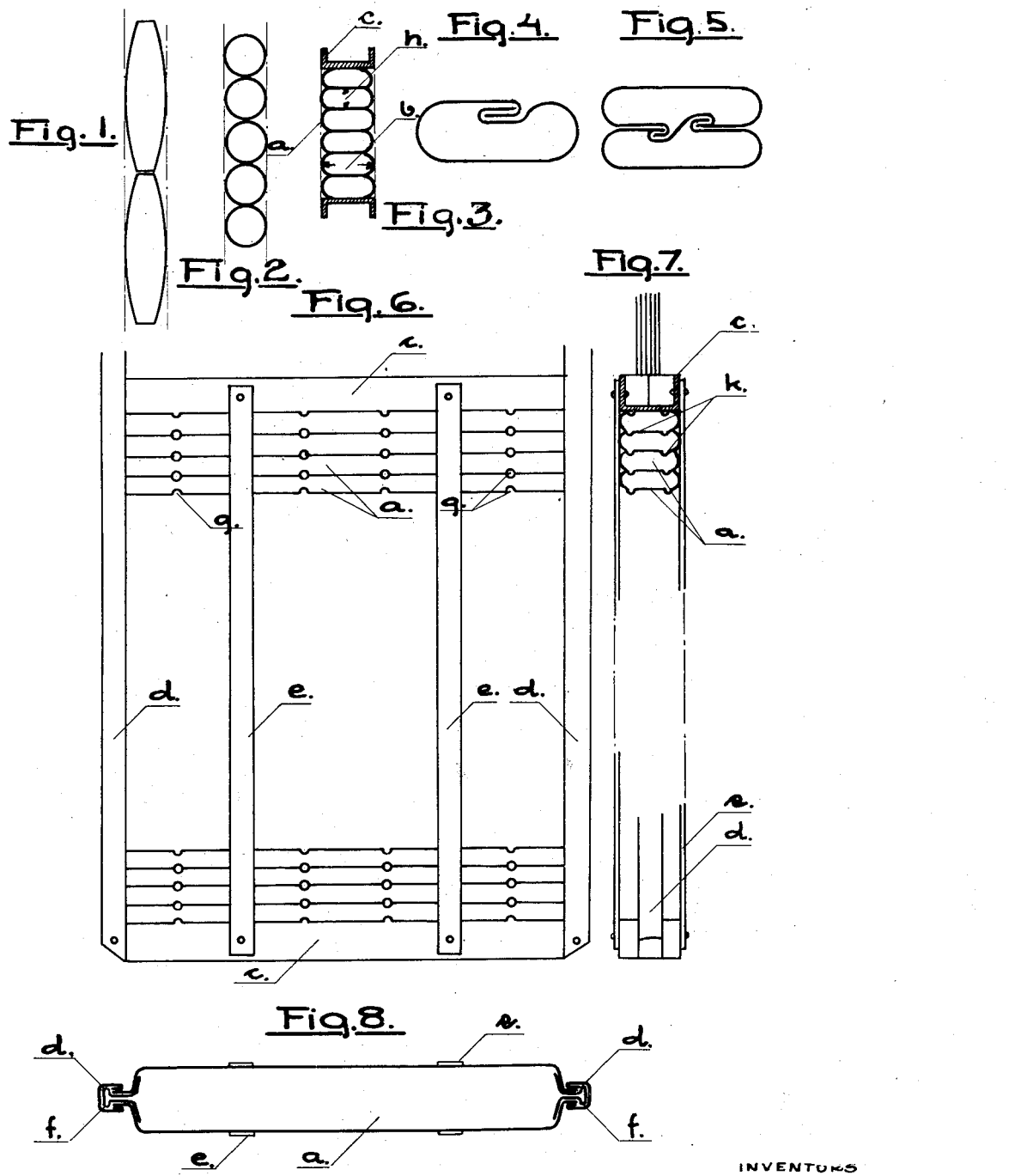

ROBERT AMELN AND CARL OSCAR JOSEF MONTELIUS, OF STOCKHOLM, SWEDEN, ASSIGNORS TO SVENSKA ACKUMULATOR-AKTIEBOLAGET JUNGNER, OF STOCKHOLM, SWEDEN, A CORPORATION.

ELECTRODE FOR ELECTRIC CELLS.

1,411,256.　　Specification of Letters Patent.　Patented Apr. 4, 1922.

Application filed May 27, 1919. Serial No. 300,196.

*To all whom it may concern:*

Be it known that we, ROBERT AMELN and CARL OSCAR JOSEF MONTELIUS, subjects of the King of Sweden, and residing at Stockholm, Sweden, have invented a new and useful Electrode for Electric Cells, of which the following is a specification.

The present invention comprehends generally improvements in that class of invention known as electrochemistry and more particularly relates to electrodes for electric cells, preferably storage cells as well as the process for making such electrodes.

Particularly in alkaline storage cells and also in some cases in lead accumulators, the electrodes are made with a perforated metal casing containing the active material. Obviously the simplest form of these electrodes is an arrangement consisting of two thin, plane, perforated plates holding the active material between them. As the active material absorbs the electrolyte most vigorously thereby showing a marked tendency to swell, these container plates must be held together in some way or other for example by wires or rivets or by division of the plates into pockets each being separately held together by folds. In addition to these plane electrodes, tube shaped electrodes have also been employed.

The plane electrodes, as constructed heretofore, seem to allow of a much better utilization of the cell space than the round tube electrodes. On account of the said swelling of the electrode material the shape of the electrodes can however never be exactly plane and a complete utilization of the cell space can therefore never be attained with these electrodes. Pockets of a rectangular cross-section will thus assume an elliptic form by the influence of the electrolyte, and on this account the cell space cannot be utilized much better with such electrodes than in electrodes with tube shaped pockets of a circular cross-section.

In electrodes according to the present invention flat pockets or receptacles are used, but these are arranged with the broad sides facing each other, and not with the broad sides turned outwards, as in the above mentioned electrodes. As a result many advantages are attained. In the first place, it is evident that by making these receptacles comparatively thin, the volume occupied by the electrode plate will be efficiently utilized. If for example, the thickness $h$ of the receptacles be 2 mm. while their width $b$ is 8 mm, then 94.6% of the space occupied by the electrode plate will be utilized whereas in electrodes of the elliptic and tubular type mentioned, the corresponding value is only 78.6%.

Another advantage is to be found in the present construction that the distance between the conducting metal casing and the most distant particle of the active material may be diminished considerably by reducing the thickness $h$ of the receptacles, without the thickness $b$ of the electrodes having to be changed thereby reducing the drop of voltage caused by the resistance of the active mass and of the contained electrolyte.

Further such electrodes offer great advantages from a manufacturing point of view, the receptacles being made of round tubes of circular cross-section these tubes being filled up with active material and then compressed by rolling so as to give them an elongated cross section. As a result of the reduction in volume taking place when tubes of a circular cross-section are flattened out, a strong compression of the active material and consequently a good contact are obtained.

The invention is fully illustrated in the accompanying drawings in which:—

Fig. 1 is a horizontal sectional view showing a plurality of electrodes arranged in a supported position.

Fig. 2 is a large top plan detail of one form of the improved electrode.

Fig. 3 is a similar view of another form of the invention.

Fig. 4 is a side elevation of another form of electrode.

Fig. 5 is a longitudinal sectional view of the same,

Fig. 6 is a side view of another form of electrode,

Fig. 7 is a vertical section thereof partly in elevation.

Fig. 8 is a cross sectional view of the same.

To attain a good construction, the borders of the tube material may be advantageously folded together, the folds being prevented from opening by the pressing of the receptacles against each other. Figs. 2 and 3 illustrate different ways of folding the receptacles. In the arrangement according to Fig. 2 each receptacle is separately folded whereas, according to Fig. 3, the container is bent into the shape shown in Figure 6 and joined by means of two folds. The first arrangement is simpler and easier to make than the latter one.

Instead of being folded, the receptacles may also be riveted together. If desired, every joint between the edges of the sheet-metal can be avoided, if the receptacles are held together by suitable exterior bandages in the form of rings or the like attached on the outside of the receptacles.

When combining a plurality of receptacles into an electrode, it is important to hold the receptacles together in such a manner, that a transverse expansion of the receptacles as a result of the swelling of the active material under the influence of the electrolyte is avoided. To this end, the receptacles $a$ are preferably arranged between two longitudinal bars $c$, as shown in Fig. 1, which bars are kept at a fixed distance from each other by means of transversal studs or stays or the receptacles may be kept together by means of bandages, for instance in the form of spiral-wound or annular bands holding all receptacles of the electrode.

Figs. 4, 5, and 6 show another form of an electrode and in reducing this feature of the invention to practice, the receptacles are mounted in a rigid frame consisting of two longitudinal bars $c$ of U-shaped cross section and two transversal bars $d$ holding the ends of the receptacles. These bars are riveted together at the corners so that the receptacles $a$ are held firmly pressed to each other by the bars $c$, the lateral bars $d$ thereby receiving the pressure exerted by the swelling of the active material. In using long receptacles, stays $e$ are preferably provided to prevent a central bending of the bars $c$. In place of the stays $e$, transversal bands or wires may be arranged such bands or wires being drawn through holes in the receptacles and then attached to the bars $c$. The last mentioned arrangement has the advantage, too, that the bands or wires give the electrode a certain transversal rigidity and prevent a lateral displacement of the separate receptacles. The staying of the two bars $c$ may also be effected by means of other electrodes within the same cell, the electrodes being arranged with the receptacles alternately in an upright and a lying position whereby the receptacles of each electrode form transversal stays for the adjacent electrodes, said stays serving the same purpose as the bars or stays $d$ and $e$ as regards the holding together of the receptacles.

The closing up of the ends of the receptacles is effected preferably by compressing the ends from opposite sides, a T-shaped member $f$, as shown in Fig. 6, having been inserted prior to this operation, which member $f$ afterwards serves to retain the receptacle in the lateral bars $d$ the edges of which are bent for the purpose as illustrated in Fig. 8. In a similar manner the ends of the bars $c$ are compressed from the sides and inserted in the bars $d$.

To attain a good circulation of the electrolyte, without reducing the thickness of the plates transversal grooves $g$ are pressed into the sides of the receptacles facing each other, the said grooves being preferably arranged opposite each other so as to form passages between the receptacles. Through these passages the electrolyte may penetrate to the inner parts of the receptacles, the walls of the passages being also perforated. The receptacles may also be provided with longitudinal pressed elevations and depressions $h$ as shown in Fig. 5, the said elevations and depressions fitting each other so as to prevent lateral displacements of the receptacles. These elevations and depressions are preferably produced simultaneously with the above mentioned compression of the receptacles filled up with active paste.

What we claim as new and desire to secure by Letters Patent of the United States is:—

1. A plate electrode for electric cells consisting of a plurality of flattened tubular receptacles placed together with the flattened sides facing each other in planes perpendicular to the sides of the electrode.

2. A plate electrode for electric cells consisting of a plurality of flattened perforated receptacles placed together with the flattened sides facing each other in planes perpendicular to the sides of the electrode and a clamping device for holding the receptacles together so as to prevent a transverse expansion of the receptacles on account of the swelling of the active mass.

3. A plate electrode for electric cells consisting of a plurality of flattened perforated receptacles placed together with flattened sides facing each other in planes perpendicular to the sides of the electrode, two longitudinal bars holding the receptacles between them and transversal stays connecting said bars to prevent a transverse expansion of the receptacles on account of the swelling of the active mass.

4. A plate electrode for electric cells consisting of a plurality of flattened perforated receptacles placed together with the flattened sides facing each other in planes perpendicular to the sides of the electrode, transversal grooves being pressed into the broad sides of the receptacles to facilitate the circulation of the electrolyte.

5. A plate electrode for electric cells consisting of a plurality of flattened perforated receptacles placed together with the flattened sides facing each other in planes perpendicular to the sides of the electrode, said receptacles being provided with longitudinal depressions and elevations pressed into the flat sides of the receptacles and engaging each other so as to prevent a lateral displacement of the receptacles.

In witness whereof we have hereunto set our hands in the presence of two witnesses.

ROBERT AMELN.
CARL OSCAR JOSEF MONTELIUS.

Witnesses:
 GUST SPRIEN,
 ELIN WAHMAN.